United States Patent [19]
Lecheler et al.

[11] Patent Number: 5,740,021
[45] Date of Patent: Apr. 14, 1998

[54] SWITCHING POWER SUPPLY FOR THE OPERATION OF ELECTRIC LAMPS

[75] Inventors: Reinhard Lecheler, Neuburg an der Donau; Franz Raiser, Munich, both of Germany

[73] Assignee: Patent-Treuhand-Gesellschaft Für elektrische Gluehlampen mbH, Munich, Germany

[21] Appl. No.: 737,431

[22] PCT Filed: May 17, 1995

[86] PCT No.: PCT/DE95/00653

§ 371 Date: Nov. 11, 1996

§ 102(e) Date: Nov. 11, 1996

[87] PCT Pub. No.: WO95/33299

PCT Pub. Date: Dec. 7, 1995

[30] Foreign Application Priority Data

May 30, 1994 [DE] Germany .................. 44 18 886.2

[51] Int. Cl.$^6$ .................. H02M 5/458; H05B 37/02
[52] U.S. Cl. .................. 363/37; 363/39; 315/224
[58] Field of Search .................. 363/34, 37, 39, 363/41, 124, 132, 89, 98; 315/224, 226, 246

[56] References Cited

U.S. PATENT DOCUMENTS

| | | | |
|---|---|---|---|
| 4,612,480 | 9/1986 | Kneisel | 315/224 |
| 4,625,270 | 11/1986 | Taylor | 363/39 |
| 4,792,887 | 12/1988 | Bernitz et al. | 363/89 |
| 4,862,041 | 8/1989 | Hirschmann | 315/246 |
| 5,111,373 | 5/1992 | Higaki | 363/37 |
| 5,610,479 | 3/1997 | Schmitt | 315/226 |

FOREIGN PATENT DOCUMENTS

| | | |
|---|---|---|
| 0 444 428 | 9/1991 | European Pat. Off. . |
| 0 485 865 A1 | 5/1992 | European Pat. Off. . |
| 41 37 207 A1 | 5/1993 | Germany . |
| 59-129 571 | 7/1984 | Japan . |

OTHER PUBLICATIONS

"Schaltnetzteile" (Switched–Mode Power Supplies), Siemens AG, Berlin, 1990, p. 72 et seq.
"Schaltnetzteile in der Praxis" (Switched–Mode Power Supplies in Practice) Vogel Buchverlag, Würzburg, 1986, p. 355 et seq.

*Primary Examiner*—Adolf Berhane
*Attorney, Agent, or Firm*—Frishauf, Holtz, Goodman, Langer & Chick, P.C.

[57] ABSTRACT

The invention relates to a radio interference suppression circuit for switching power supplies which are suitable for operating both discharge lamps and incandescent lamps. The radio interference suppression circuit has at least one controlled additional source (ZW, F) and one open-loop control circuit (TR1). The additional source or additional sources (ZW, F) generate targeted compensation signals, which are inverted with respect to the interference signals caused by the fast switching transistors (T1, T2). The additional source is either coupled parallel to the interference source and capacitively to the environment (ZW, F) or electrically connected into the supply leads in series with the interference source. In the first case, the additional source preferably includes a metal face (F), mounted in the vicinity of the switches (T1, T2), the potential changes of which face are inverted relative to those of the interference source—which is essentially the region around the junction point (M) of the switching transistors (T1, T2)—for instance by means of a transformer (TR1). In the second case, the additional sources are preferably formed by two secondary windings of the transformer. The primary winding is triggered by the potential changes of the interference source and in the secondary—side supply leads induces a phase-opposition common mode compensation signal. Optionally, the interference suppression can also be in the form of a closed-loop control circuit, in which the common-mode noise of the supply leads acts as the controlled variable.

16 Claims, 8 Drawing Sheets

SWITCHING POWER SUPPLY FOR THE OPERATION OF ELECTRIC LAMPS

FIELD OF THE INVENTION

The invention relates to switching power supplies for operating electric lamps connected to an alternating voltage mains network or a direct voltage source, and more particularly to a radio noise suppression circuit thereof.

BACKGROUND

Switching power supplies are suitable both for operating discharge lamps, especially fluorescent lamps and high-pressure lamps, and for operating incandescent lamps, such as low-voltage incandescent halogen lamps. Switching power supplies for operating discharge lamps are generally called electronic ballast devices (EBDs), while for low-voltage incandescent halogen lamps, the term electronic transformer or electronic converter is conventional.

Switching power supplies supplied by an alternating voltage mains network are also known as on-line switched-mode power supplies. If a switched-mode power supply is connected to a direct voltage source, such as a battery, then it can also be called an off-line switch-mode power supply. It is also possible to connect two or more switching power supplies in the manner of a cascade circuit; the output of a preceding power supply is then connected to the input of the next power supply, and so forth. In European Patent Disclosure EP-A 0 485 865, for instance, a circuit arrangement for operating a discharge lamp is shown. The circuit arrangement is supplied from a direct voltage source, such as an on-board electrical system of a motor vehicle, and has a step-up converter (upward controller) and optionally a downstream inverter for operating a discharge lamp with alternating current (AC).

One essential feature of switching power supplies is at least one switching portion having one or more fast switches—for which fast switching transistors are used as a rule. The switching portion may—for instance as explained in W. Hirschmann and A. Hauenstein, *Schaltnetzteile [Switched-Mode Power Supplies]*, Siemens AG, Berlin, 1990, page 40 ff.—be in the form of a choke converter (downward, upward, or upward-downward controller, inverter), flyback converter, forward converter, or push-pull converter (in half- and full-bridge circuit). The switching portion converts the voltage at its input, such as the rectified mains voltage or the output voltage of a preceding converter, into a high-frequency switched voltage. Especially in the region of the switches, this creates fast potential changes relative to the grounded housing mass (protection class I devices) or the environment or ground (protection class II devices). Via capacitive couplings, the electrical fields, which vary over time, connected to the potential changes can affect common-mode noise, or interference, which for instance flows over the mains supply leads and through the switching power supply. The noise loop is closed via parasitic capacitances especially between the switching portion and ground. A detailed description of how radio noise arises can be found for instance in W. Hirschmann and A. Hauenstein, *Schaltnetzteile [Switched-Mode Power Supplies]*, Siemens AG, Berlin, 1990, page 72 ff. With respect to the limit values for radio noise in switching power supplies, VDE Specification 0871, and especially for electrical operating devices for lamps, VDE 0875—which corresponds to International Standard CISPR 15—must be adhered to.

One conventional provision to suppress common-mode noise is to incorporate an interference suppression filter, such as a current-compensated choke, into the mains supply leads. The design of current-compensated chokes is explained for instance in O. Kilgenstein, *Schaltnetzteiie in der Praxis [Switched-Mode Power Supplies in Practice]*, Vogel Buchverlag, Würzburg, 1986, p. 355 ff. Its effect is based on the fact that the mains-frequency useful current can pass through undamped. High-frequency common-mode noise, conversely, is filtered out by the high inductance of the current-compensated choke. However, there are limits to compact structure, since the interference-suppressing action of a current-compensated choke can be reduced by immediately adjacent components and their noise signals or even—especially because of magnetic interference fields—be converted into an opposite kind of action.

In protection class I devices, Y capacitors can additionally be connected from the mains supply leads to the protective or ground conductors; as a result, at least some of the common-mode noise can flow away to ground. This possibility does not exist with protection class II devices.

European Patent EP 0 264 765 to which U.S. Pat. No. 4,862,041 corresponds, describes an electronic converter for operating low-voltage incandescent halogen lamps, which has a current-compensated choke for suppressing radio interference. The secondary side of the power transformer—which acts as a decoupling circuit that transforms the switched voltage of the switching portion to the rated voltage of the low-voltage incandescent halogen lamps connected to it—is also connected via a capacitor to the positive or negative pole of the mains rectifier. As a result, an HF short circuit is created, which keeps interference voltage across the power transformer low. However, this provision is limited to electronic converters.

German Patent Disclosure DE-OS 41 37 207 discloses an HF interference suppressor that is also based on an HF short circuit and that can in principle be used both in EBDs and in electronic converters. To that end, an HF signal, in the case of an EBD, is for instance decoupled from the series resonant circuit of the discharge lamp and connected via a high-pass filter to an interference-suppression choke connected to the mains supply leads. If the high-pass filter is optimally dimensioned, virtually no noise currents flow via the mains supply leads. However, the hf impedance of the interference suppression choke varies as a function of the value of the input current flowing through it. As a result, the interference suppression action varies sensitively with the load connected.

THE INVENTION

The object of the invention is to overcome these disadvantages and to disclose switching power supplies for operating electric lamps whose common-mode radio line noise is below the limit values for pertinent specifications. Moreover, the radio interference suppression circuit should enable a compact design of the power supply and should be suitable in principle for both electronic converters and electronic ballast devices. Another aspect of the object is to disclose an especially economical version with as few additional components as possible.

Briefly, the fundamental concept of the present invention is to compensate for interference signals—interference voltages and common-mode noise—by means of one or more suitable, controllable additional source or additional sources. Compensation signals that are inverted relative to the interference signals are generated by the additional source or additional sources. By superposition, the two signals ideally cancel one another out entirely. The effectiveness of the compensation is variable by means of the amplitude, frequency and course over time of the compensation signal and its relative phase relationship to the interference signal. In an open-loop controlled version of switching power supplies of the invention, these influencing variables are fixedly set. In a closed-loop controlled version, the controlled variable is suitably obtained from the common-mode noise that flows in the mains supply leads or in the input-side connecting leads of the switching portion. Preferably, the closed-loop control is set such that the aforementioned interfering signals are minimized.

The controllable additional source—which functions essentially as a voltage source—is connected either parallel or serially to the interference source, or in other words to the switching portion. In the first case, an additional source in the form of a voltage generator and a coupling element connected to it is disposed in the vicinity of the switches, and thus similarly to the interference source is coupled capacitively to the environment, such as the ground. The interference current flowing from the interference source to the environment via parasitic capacitances is compensated for in that an inverted compensation current—also flowing to the environment via these parasitic capacitances, is influenced by the additional source. This is accomplished by targeted potential changes of the additional source, which are inverted relative to those of the interference source. This means that the courses over time of the two potential changes are identical except for a phase rotation of typically 180°.

In the second case, the supply leads of the switching portion, coming from an alternating voltage mains network or a direct voltage source, each have one additional source. If the switching power supply is supplied from a alternating voltage mains, then the additional sources can selectively be connected serially into the input or output leads of a mains rectifier. By suitable triggering, each of these additional sources then generates a compensation voltage, which is inverted relative to the interference voltage generated by the interference source. The compensation voltage and the interference voltage are adapted to one another such that ideally they compensate for one another completely, and consequently the creation of common-mode noise is averted. The phase-locked coupling between the compensation signal and the interfering signal is assured in both cases by means of a synchronizing signal obtained from the interference source, which signal, in the case where a push-pull converter is used, is picked up for instance at the center point between two bridge transistors.

The coupling element of the parallel additional source is formed by an equipotential face, that is, an electrically conductive surface, for instance of metal or conductive plastic. It is connected to one pole of the controllable voltage generator and acts like one half of a plate capacitor coupled parasitically to the environment. The equipotential face is advantageously located in the vicinity of the switching portion, preferably on the printed circuit board of the switching power supply. This assures that a change in parasitic capacitive couplings—for instance by placing the entire circuit arrangement in a grounded metal housing—occurs to the same extent for both the interference source and the equipotential face of the additional source, and consequently the compensation is preserved approximately without change. The potential changes of the equipotential face required to generate a compensation current are brought about by the voltage generator, suitably triggered with the aid of the open-loop control circuit; the level of the influenced compensation current can be varied, among other provisions, by means of the geometrical dimensions of the equipotential face and especially its surface area.

In a first embodiment, the open-loop control circuit comprises an inverter stage and a downstream driver stage. For synchronization, the input of the inverter stage is connected to the switching portion. The inverted synchronization signal is supplied via the driver stage to the downstream controllable voltage generator, which comprises a push-pull end stage. The driver stage—preferably in the form of an operational amplifier—controls the complementary transistors of the push-pull end stage. The output of the push-pull end stage is connected to an equipotential face and changes its potential inversely to the synchronization signal. The voltage supply for the push-pull end stage is preferably drawn from the voltage supply of the switching portion, in this way, potential changes can be generated on the equipotential face whose amplitudes correspond to those of the interference source. By a suitable choice of the transistors of the push-pull end stage and their triggering, it is assured that the rises in the potential changes correspond to the steep switching edges of the transistors of the switching portion. In a variant, the complementary transistors are replaced by identical transistors. However, this would require separate-potential trigger signals for the transistors, which means more components and consequently higher costs.

In a second embodiment, the open-loop control circuit comprises the primary winding of a transformer, and the voltage generator comprises the secondary winding of the transformer. For synchronization with the interference signal, the primary winding is connected to the switching portion. The secondary winding is connected on its first end to an equipotential face and on its second end, which is the base point, to a suitable potential of the circuit in such a way that together with a direction of the winding of the transformer, an inversion between the synchronizing signal and the voltage signal of the secondary side is attained. The compensation current can be varied by means of the step-up ratio of the transformer and the size of the equipotential face.

Typically, switching power supplies contain inductive components that are connected to the switching portion, examples being lamp chokes in EBDs, converter chokes in blocking converters, or power transformers in electronic converters. In a preferred embodiment, these inductive components are simultaneously jointly used as an open-loop control circuit for the controllable additional source, or in other words as a component of the aforementioned transformer. In an especially preferred variant for electronic converters, the voltage generator is formed as a contrary—direction additional winding on the core of the transformer, the first end of which winding is connected to the equipotential face. This represents an especially inexpensive, compact version of the radio interference suppression circuit, since only one additional winding but no additional components are needed. The equipotential face can be attained and again way and again without additional expense in the form of a metal face by means of a suitable layout on the copper-lined printed circuit board of the switching power supply. The base points of the additional winding and of the primary winding of the transformer are preferably connected to one another. The metal face is connected to the free end of the additional winding. The compensation can be varied not only by the size of the metal face but also by the number of windings of the additional winding and by the choice of potential of the base point of the additional winding.

In a preferred embodiment of the second case, the serial additional sources are formed by the secondary windings of a transformer—hereinafter called a feed transformer; one secondary winding is connected serially into each supply lead of the switching portion coming from a voltage source. The number of secondary windings is accordingly equal to the number of supply leads. Optionally, a mains rectifier precedes or follows the additional sources as well. The open-loop control circuit comprises the primary winding of the feed transformer, which is coupled with the secondary windings in the opposite direction. The primary winding is connected to the switching portion, for instance to a junction point of the switches—optionally via an additional impedance. In this way, the synchronizing signals that flow through the primary winding induce compensation voltages in the secondary windings; these compensation voltages are inverted relative to the interference voltages of the switching portion. The compensation can be varied by the dimensioning of the feed transformer (step-up ratio, direction of winding) and optionally of the additional impedance.

The closed-loop controlled version of the various embodiments of the radio interference suppression circuit of the invention are attained as explained below. In the circuit arrangements described above, a transformer—hereinafter called a sensor transformer—is additionally provided. Its primary side comprises two windings which are each serially connected into the mains supply leads or the switching portion supply leads. The secondary side comprises one winding and is connected to the inputs of a closed-loop control amplifier. The direction of winding is designed such that only common-mode noise on the supply leads of the primary side induce a significant, phase-opposition signal in the secondary winding. In the closed-loop controlled version, the inverter stage, which is needed in the case of the parallel-connected open-loop controlled additional source (push-pull end stage with equipotential face) can thus be dispensed with. As the closed-loop control amplifier, the driver stage already described in the open-loop controlled version is used. It controls a downstream push-pull end stage, which in turn is connected to the equipotential face. Via the capacitive coupling of the equipotential face to the environment, a common-mode compensation current is generated, which closes the control loop. In the case of serially connected additional sources, the push-pull end stage and equipotential face are replaced by the feed transformer.

A decisive advantage of the invention should be mentioned expressly again in this connection. Although both the two primary windings of the sensor transformer and the two secondary windings of the feed transformer each act as current-compensated chokes, nevertheless a resultant damping of common-mode noise is unnecessary for the compensatory action of the radio interference suppression circuit. For the idling inductances of the windings, values can therefore be chosen that are far lower (for instance, 1 mH) than those of conventional current-compensated chokes (such as 20 mH). As a result, decisively more-compact dimensions of the circuit arrangement are attained.

The reduction in common-mode noise by the phase-opposed currents (parallel additional source) or voltages (serial additional sources) is approximately proportional to the circuit gain of the control loop. The circuit gain K is composed of the transmission factors of the transformers connected in the control loop and the gain of the closed-loop control amplifier. For K>50, a reduction in the common-mode noise that is already adequate for the pertinent regulations is attained. The bandwidth of the circuit gain should be chosen such that the expected interference spectrum can be compensated for, or in other words cancelled out.

DRAWINGS

The invention will be described in further detail below in terms of several exemplary embodiments. Shown are.

DETAILED DESCRIPTION

Figure 1:
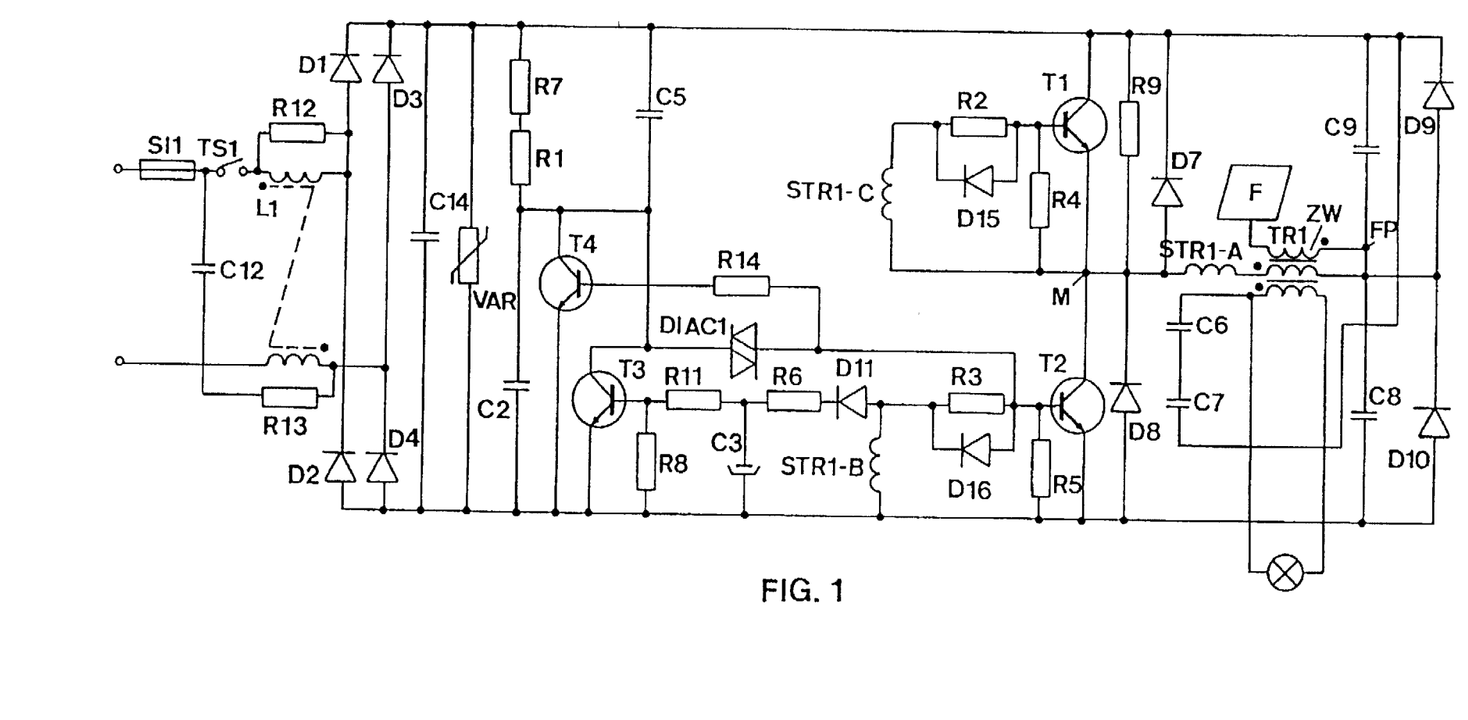
FIG. 1, the circuit diagram of an electronic converter according to the invention for low-voltage incandescent halogen lamps, with an open-loop controlled radio interference suppression circuit which has an additional winding and a metal face, connected to it, as an additional source connected parallel to the interference source.

FIG. 1 shows the circuit diagram of an electronic converter for 12 V incandescent halogen lamps with a maximum power consumption of 105 W. The individual components will be explained below. The input of the circuit is protected by the fuse S11 and the thermal switch TS1 against excessive currents and excessive temperature. This is followed by a differential interference suppression filter, comprising the X capacitor C12 and the double choke L1. One of each of the two windings of the double choke L1 is connected serially with one each of the two supply leads of the input and is damped each with a parallel resistor R12, R13. This is followed by a mains rectifier, comprising the diodes D1–D4 in a bridge circuit, whose output has a parallel-connected filter capacitor C14 and a varistor VAR as over-voltage protection.

This is followed by a free-running current-feedback inverter in a half-bridge circuit. Its function is extensively described in published German Patent Application DE 44 16 401 A1 by the inventor hereof. This Publication relates to a circuit to operate electric lamps which, essentially, includes a rectifier circuit, an inverter connected as a half-bridge or a full-bridge, which is self-oscillating and current feedback coupled, and a trigger generator, which has at least a resistor, a charge capacitor and a voltage dependent switching element, such a diac. A controlled discharge resistor, particularly a transistor, is coupled in parallel to the charge capacitor. The discharge resistor is controlled by the inverter. When the inverter oscillates, the charge capacitor is discharged through the discharge resistor and thereby prevents undesired generation of trigger pulses. Therefore only the individual functional groups and components will be described below. Its key part is a free-running, current-feedback half-bridge converter, essentially comprising the two switching transistors T1, T2—to each of which one return diode D7, D8 is connected parallel; the two bridge capacitors C8, C9, each with one parallel-connected diode D9, D10; the power transformer TR1, whose secondary winding is connected to the positive pole of the mains rectifier via the radio interference suppression capacitors C6, C7 and to which a 12 V incandescent halogen lamp is connected; and a control transmitter STR1-A through STR1-C, which furnishes the control signals for the bridge transistors T1, T2, which signals are supplied, each via a trigger circuit comprising the resistors R2, R4 and R3, R5 and the diodes D15 and D16, respectively, to the base terminals of the bridge transistors T1 and T2. The half-bridge converter is started by means of a conventional trigger generator, which essentially comprises the resistors R1, R7, the charge capacitor C2, and the diac DIAC1. The transistor T4, connected parallel to the charge capacitor C2, whose base is connected via the resistor R14 to the base of the half-bridge transistor T2, prevents the occurrence of undesired trigger pulses while the half-bridge converter is oscillating. This characteristic is already disclosed in German Patent Application DE 44 16 40A1. A protection circuit known per se, substantially comprising the transistor T3, the capacitors C3, C5, the diode D11 and the resistors R6, R8 and R11, protects the bridge transistors T1, T2 against secondary-side overload. In accordance with a feature of the invention, the radio interference suppression circuit comprises an additional winding ZW on the power transformer TR1 and a metal face F. The additional winding ZW and the primary winding of the power transformer TR1 have opposite winding directions and each comprise 73 windings. They are connected to one another at the base point FP. The free end of the additional winding ZW is contacted to the metal face F. In this way, the potential changes of the center point M between the two bridge transistors T1, T2 are transmitted in phase opposition to the metal face F. The components used are listed in Table 1.

Figure 2:
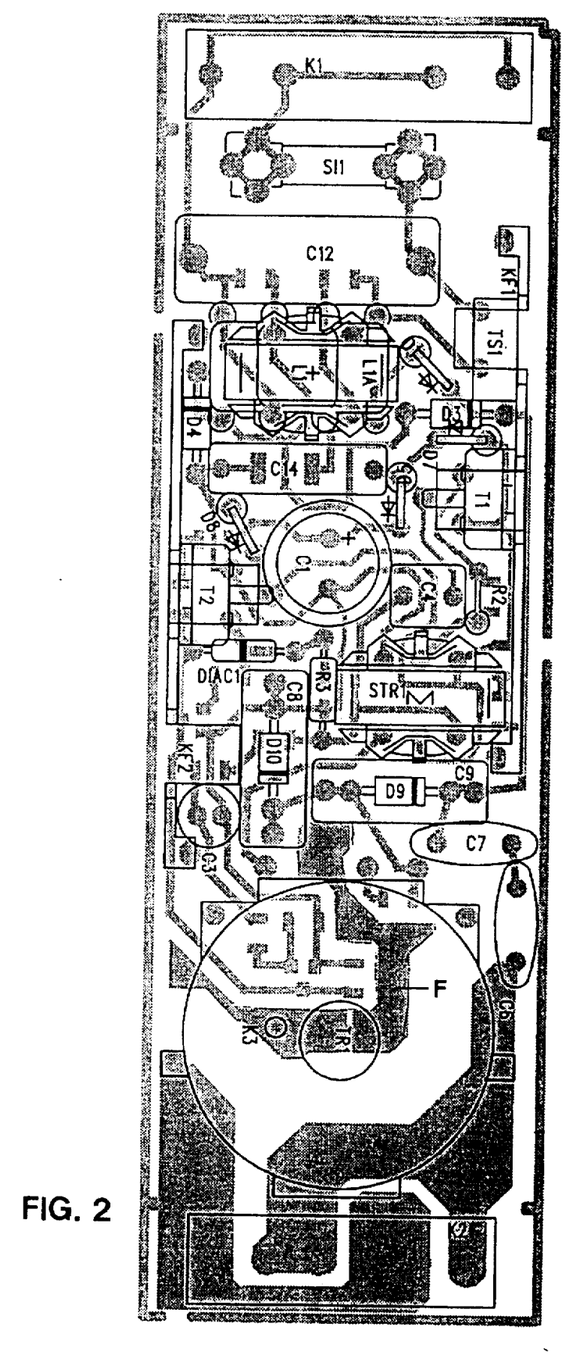
FIG. 2, the layout of the printed circuit board equipped in accordance with the electrical circuit of FIG. 1.

FIG. 2 shows the layout of the printed circuit board, produced and equipped in accordance with FIG. 1. In a known manner, radio interference is dependent to a high degree on parasitic capacitances and inductances and consequently on the components used, their three-dimensional arrangement, and their electrical connections to one another. The metal face F is therefore carefully adapted to this layout. The production of the metal face F is effected upon etching of the printed circuit board directly out of the copper coating. Thus there are neither additional production expenses nor additional material costs. This is accordingly an especially economical form of the interference suppression circuit according to the invention.

Figure 3A:
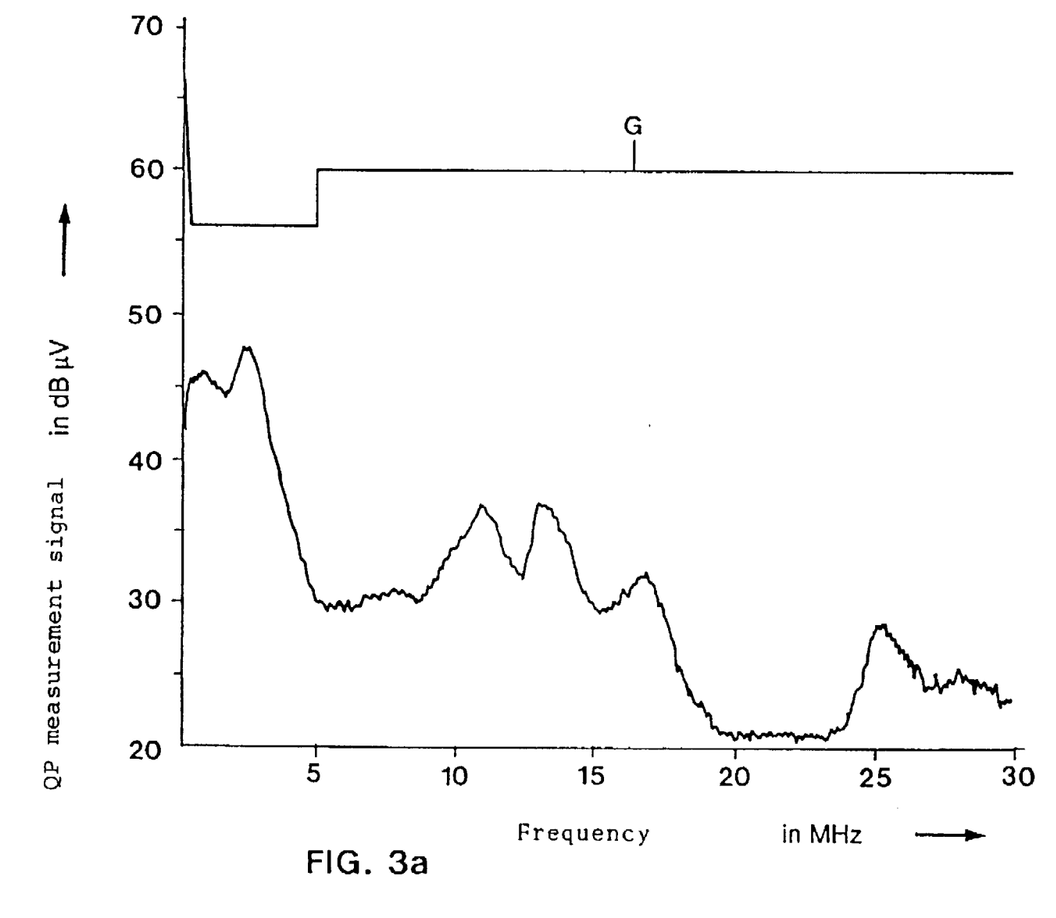
FIG. 3a, the interference spectrum, measured by the CISPR 15 Standard, of the electrical circuit of FIG. 2 in the range between 150 kHz and 30 MHz, in which the power transformer is connected to a 100 W incandescent halogen lamp over supply leads approximately 2 m long.
Figure 3B:
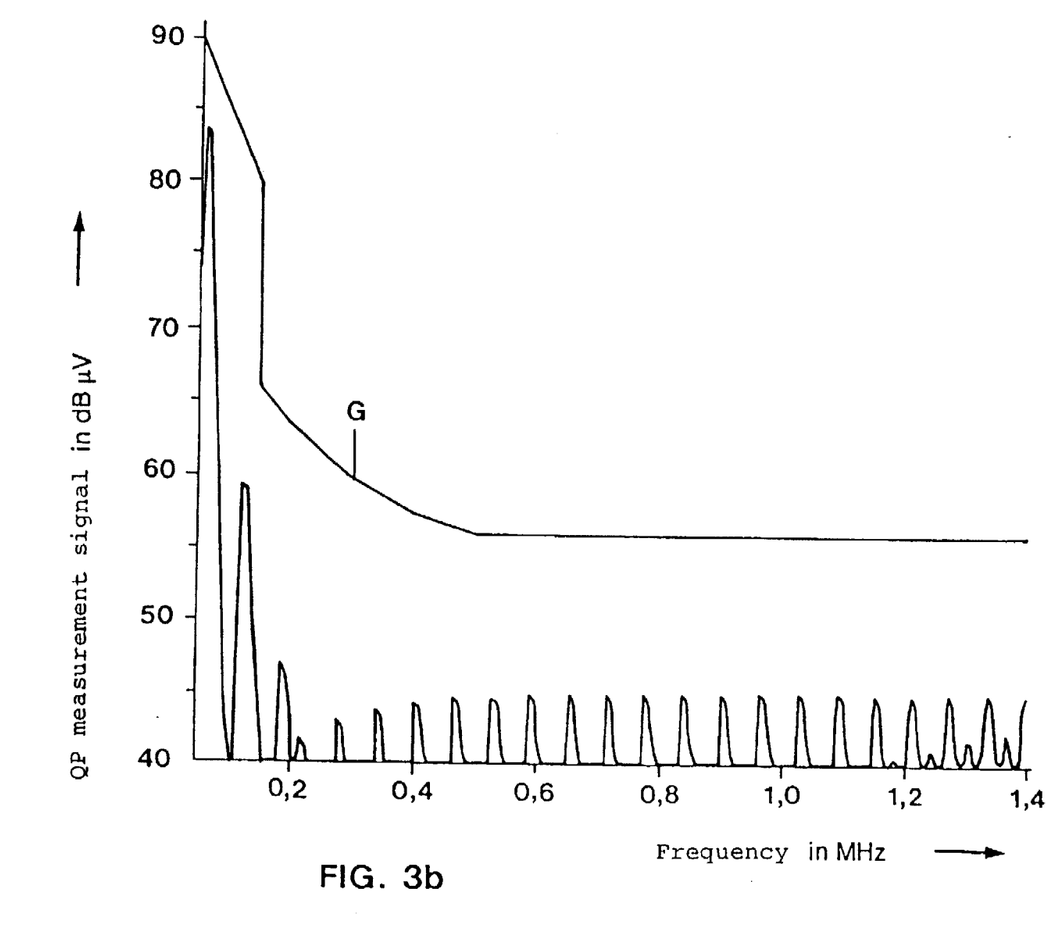
FIG. 3b, the interference spectrum of FIG. 3a, but in the range between 50 kHz and 1.4 MHz.
Figure 3C:
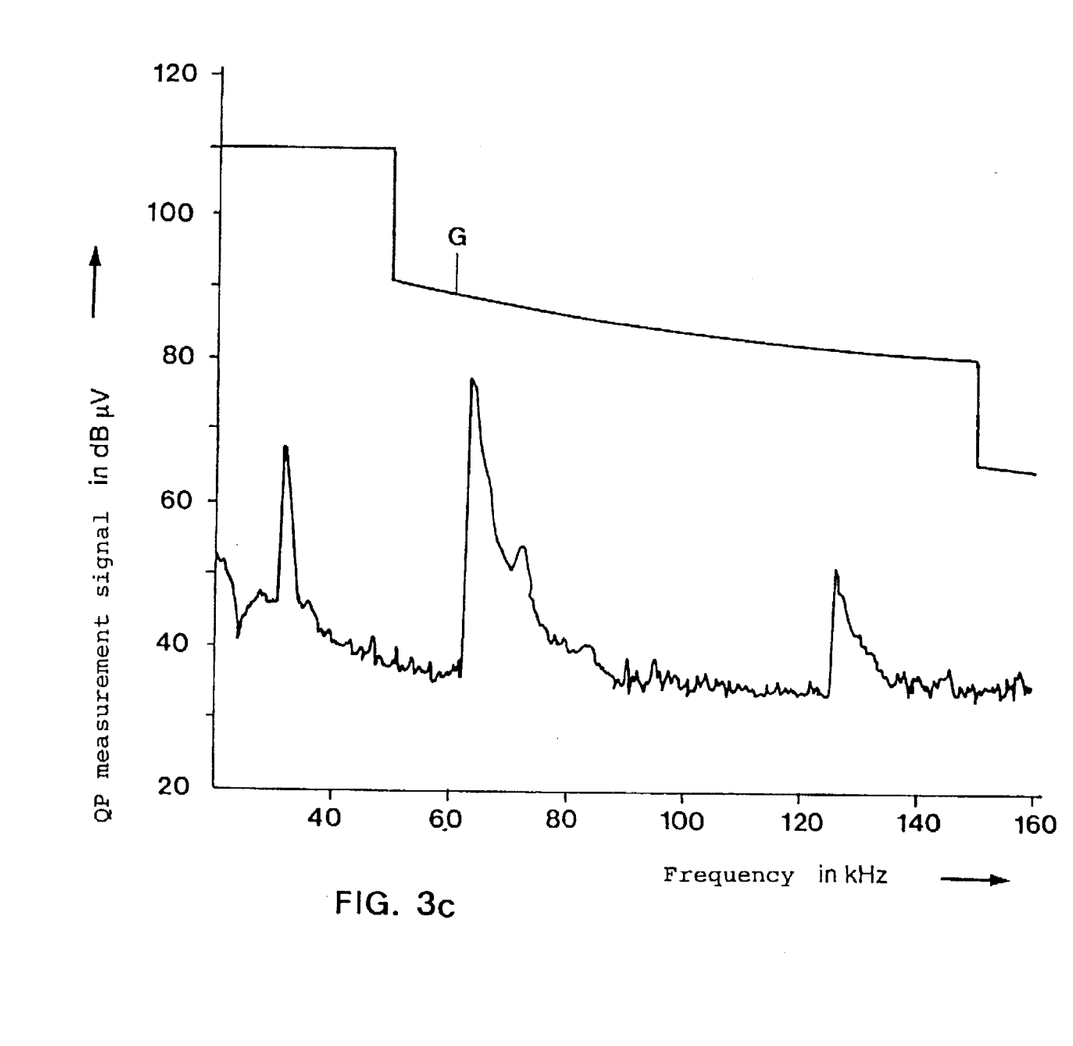
FIG. 3c, the interference spectrum of FIG. 3a, but in the range between 20 kHz and 160 kHz.

In FIGS. 3a–3b, the quasi-peak (QP) interference spectra of the electric circuit of FIG. 2 are shown, measured in accordance with the specifications of CISPR 15. During the measurement, a 100 W incandescent halogen lamp is operated with supply leads, approximately 2 m long, that are connected to the additional winding ZW of the power transformer TR1. It can clearly be seen that the measured values over the entire measurement range (20 kHz to 30 MHz) are at times considerably below the CISPR 15 limit-value line G shown. FIG. 3a shows the course of the QP measurement signal as a function of the frequency in the range between 150 kHz and 30 MHz. FIGS. 3b and 3c correspondingly show the ranges between 50 kHz and 1.4 MHz, and between 20 kHz and 160 kHz, respectively. In the last illustration, the fundamental frequency of the inverter at approximately 32 kHz and the two subsequent harmonics at twice and four times the fundamental frequency, respectively, are readily visible.

Figure 4:
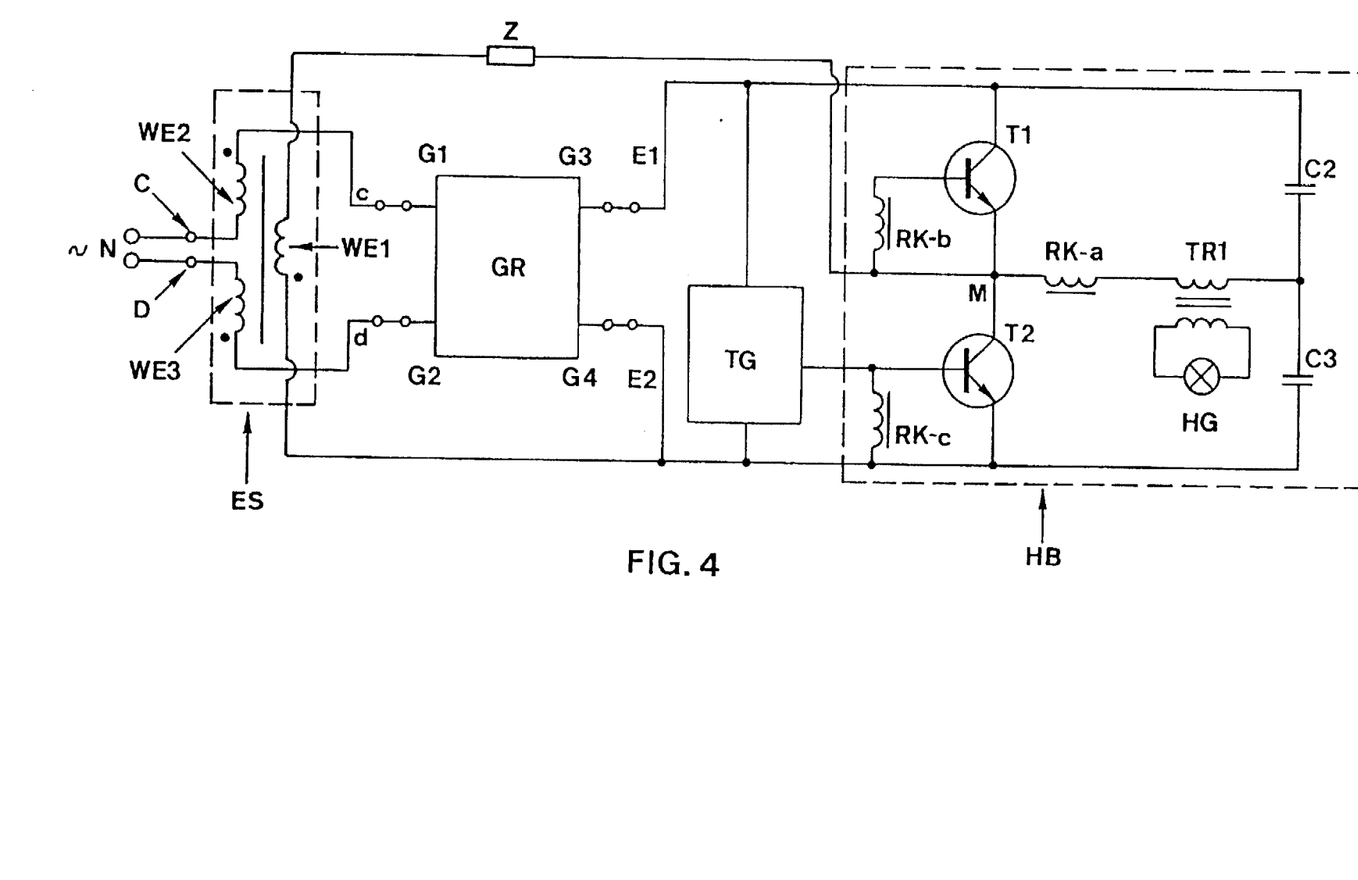
FIG. 4, the basic circuit diagram of an electronic converter according to the invention for low-voltage incandescent halogen lamps, with an open-loop controlled radio interference suppression circuit, which has a feed transformer as additional sources connected serially to the interference source.

FIG. 4 shows the basic circuit diagram of an electronic converter with a controlled serial additional source. The circuit comprises the following components: feed transformer ES, mains rectifier GR, trigger generator TG, and self-excited current-feedback half-bridge converter HB. The feed transformer ES comprises a primary winding WE1 and two secondary windings WE2 and WE3 that are connected serially to the mains supply leads N. The half-bridge converter HB substantially comprises the two bridge transistors T1 and T2, the two bridge capacitors C2 and C3, the power transformer TR1, and the control transmitter RK-a through RK-c. The rectifier GR and trigger generator TG correspond to those of FIG. 1 and are merely shown as function blocks for the sake of simplicity. The secondary windings WE2 and WE3 are connected by their first ends C and D, respectively, to the mains N and by their second ends c and d to the inputs G1 and G2, respectively, of the mains rectifier GR. The primary winding WE1 is connected by its first end to the input E2 of the half-bridge converter HB. The second end is connected via the impedance Z to the center point M of the two half-bridge transistors T1 and T2. In this way, a synchronizing current that is proportional to the interference potential of the center point M flows in the primary winding WE1 and in each of the secondary windings WE2 and WE3 induces a phase-opposed compensation voltage. The amplitude of the compensation voltage is adapted to the interference potential by means of the impedance Z in such a way that the two voltages compensate for one another, thus averting the occurrence of common-mode noise. In a variant, the feed transformer ES is connected not in the mains supply leads N but rather between the mains rectifier GR and the input of the half-bridge converter HB. In that case, the terminals C, D and c, d of the two secondary windings of the feed transformer ES are connected to the two outputs G3, G4 of the mains rectifier GR and the inputs E1 and E2 of the half-bridge converter HB, respectively. The terminals of the primary winding remain unchanged.

Figure 5:
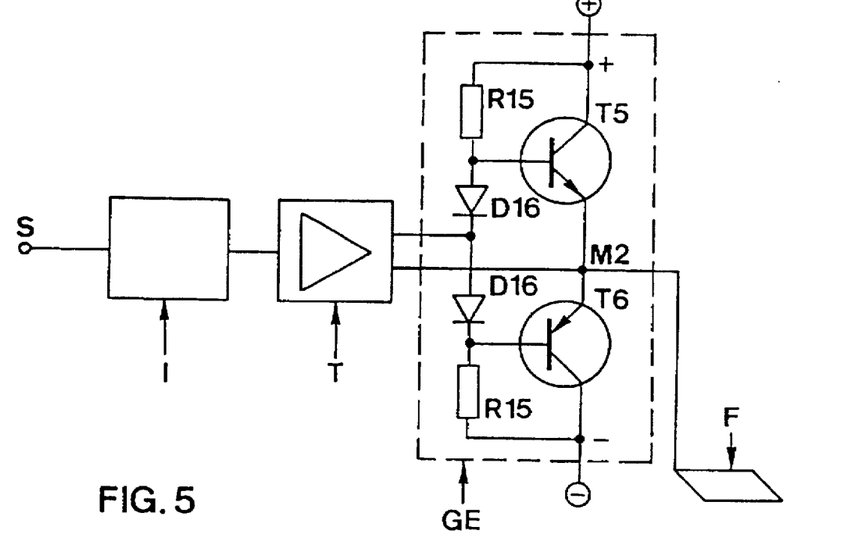
FIG. 5, the basic circuit diagram of an open-loop controlled radio interference suppression circuit, which has a push-pull end stage and a metal face connected to it as a parallel-connected additional source.

FIG. 5 shows a further exemplary embodiment of an open-loop controlled radio interference suppression circuit, which has a push-pull end stage GE and a metal face F connected to it as a parallel-connected additional source. The push-pull end stage substantially comprises the two complementary transistors T5 and T6 and one basic connection each by means of a resistor R15 and a diode D16. The metal face F is contacted to the center point M2 between the two complementary transistors T5 and T6. The open-loop control circuit comprises the inverter stage I and the driver stage T and it triggers the push-pull end stage. This radio interference suppression circuit can be built into the electronic converter of FIG. 1, for instance. In that case, the additional winding ZW can be omitted. The control input S is connected to the center point M of the bridge transistors, and the + and − terminals of the voltage supply of the push-pull end stage GE are connected respectively to the outputs G3 and G4 of the mains rectifier GR.

Figure 6:
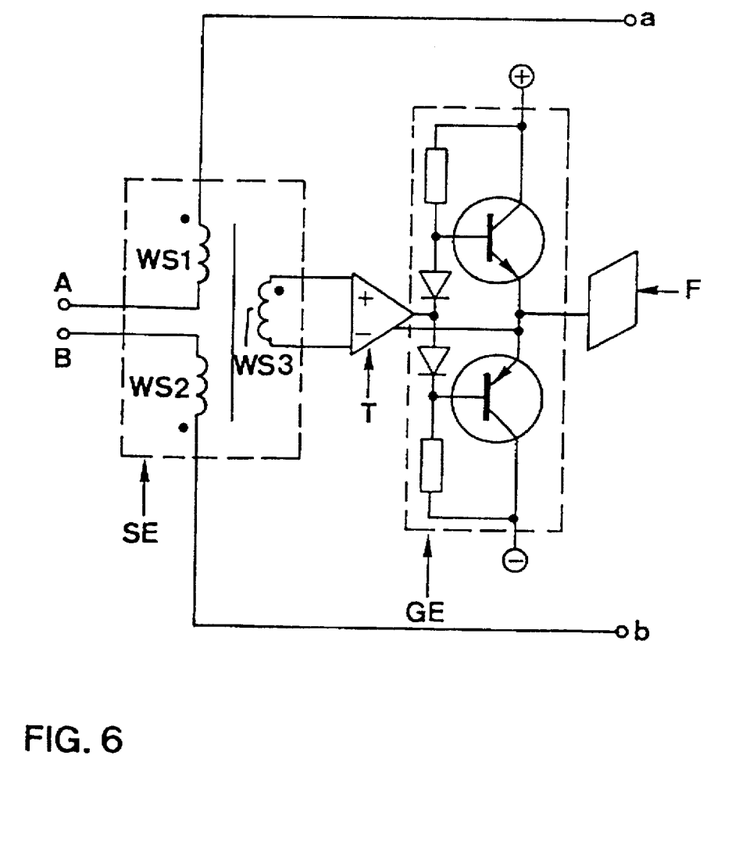
FIG. 6, the closed-loop controlled variant of the radio interference suppression circuit of FIG. 5.

FIG. 6 shows a further exemplary embodiment of a radio interference suppression circuit, which has a push-pull end stage GE and a metal face F connected to it, as a parallel-connected additional source. Unlike FIG. 5, here the circuit is designed as a closed-loop control circuit. To that end, the driver stage T is supplied from the secondary winding WS3 of a sensor transformer SE. The primary side of the sensor transformer SE has two windings WS1 and WS2, whose winding direction is adapted to the secondary winding WS3 in such a way that only primary-side common-mode noise generates a secondary-side signal. To that end, the first ends A and B of the two primary windings WS1 and WS2 are connected to the two mains supply leads N or alternatively to the two outputs G3 and G4, respectively, of the mains rectifier GR. The two other ends a and b of the secondary windings are contacted to the inputs G1, G2 of the mains rectifier GR, or alternatively to the inputs E1, E2 of the half-bridge converter HB.

Figure 7:
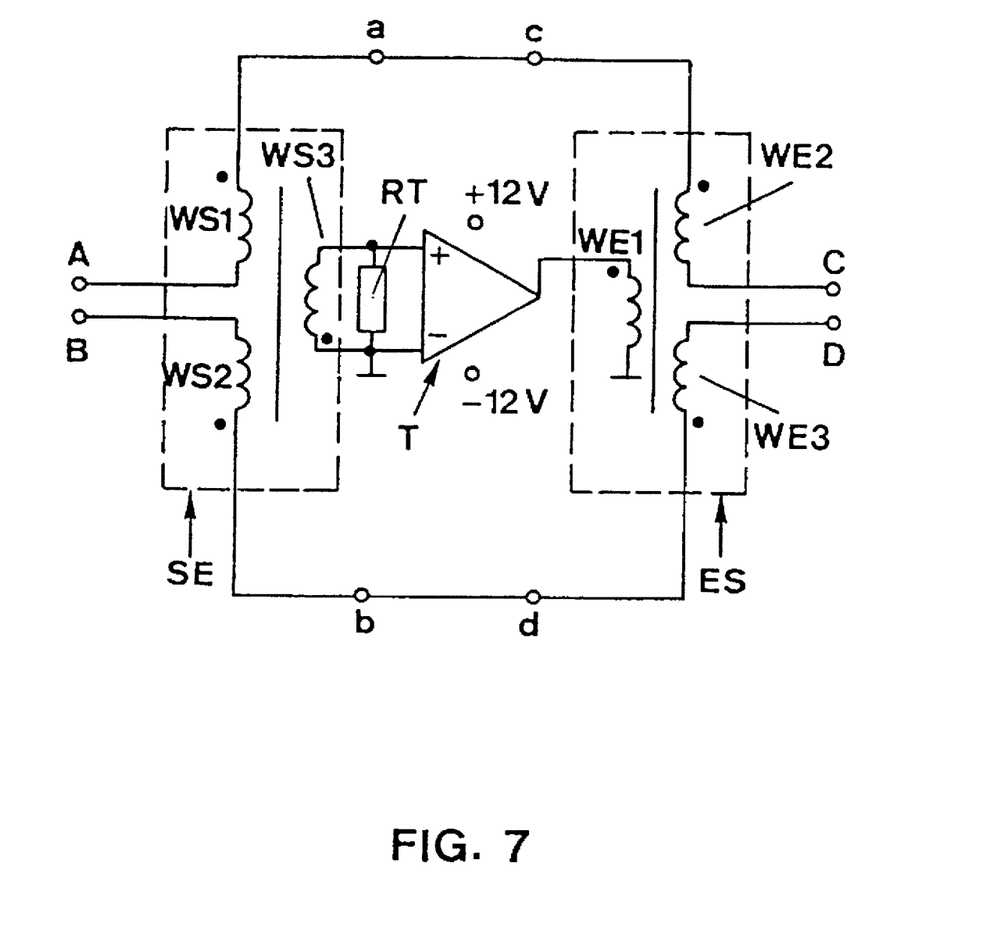
FIG. 7, the closed-loop controlled variant of the radio interference suppression circuit of FIG. 4.

FIG. 7, finally, shows an exemplary embodiment of a closed-loop controlled radio interference suppression circuit, in which two secondary windings of a transformer are used as serially connected additional sources. This circuit has both a sensor transformer SE as in FIG. 6 and a feed transformer ES as in FIG. 4. The terminals a and c, on the one hand, and b and d, on the other, of the windings, serially connected into the supply leads, of the two transformers are connected to one another. The secondary winding WS3 of the sensor transformer SE is connected via the driver stage T to the primary winding WE1 of the feed transformer ES. The driver stage is formed by an operational amplifier, whose inputs are connected to one another via the resistor RT. The circuit may for instance precede or follow the mains rectifier GR. In the first case, in FIG. 4, the interfaces C, D and c, d are disconnected, and instead of the feed transformer ES, the terminals A, B and C, D of the circuit of FIG. 7 are connected to the mains supply leads N or to the inputs G1, G2 of the mains rectifier GR. In the second case, in FIG. 4 the connections between G3, E1 and G4, E2 are disconnected, and instead the terminals A, B and C, D of the circuit of FIG. 7 are connected to the outputs G3, G4 of the mains rectifier GR or to the inputs E1, E2 of the half-bridge converter. The feed transformer ES is removed from the circuit, and the interfaces C, c and D, d are connected to one another. The dimensioning of the closed-loop control circuit can be seen from Table 1.

The invention is not limited to the exemplary embodiments described. In particular, individual characteristics of different exemplary embodiments may also be combined with one another. Moreover, the inverters mentioned may also be in the form of a full-bridge circuit and/or the decoupling circuit may be a resonant circuit for igniting and operating discharge lamps, without in principle requiring any change in the interference suppression circuit, or any loss of its advantageous effect. Finally, it is also possible for the exemplary embodiments of radio interference suppression circuits described to be installed, without fundamental changes, in other embodiments of a switching power supply, such as in choke converters (downward, upward, upward-downward controllers, inverters), flyback converters, and flow converters. In addition, identical or different forms of switching power supplies may also be combined with one another in the manner of a cascade circuit, with each individual switching power supply having its own radio interference suppression circuit.

TABLE 1

| Component list for the circuit of FIG. 1 | |
|---|---|
| SI1 | T 1A |
| R1 | 165 kΩ |
| R2, R3 | 3,3 Ω |
| R4, R5 | 100 Ω |

TABLE 1-continued

| Component list for the circuit of FIG. 1 | |
|---|---|
| R6 | 560 Ω |
| R7 | 165 kΩ |
| R8 | 51 kΩ |
| R9 | 330 kΩ |
| R11 | 240 kΩ |
| R12, R13 | 10 kΩ |
| R14 | 1 kΩ |
| C2 | 10 nF; 250 V |
| C3 | 47 µF; 6,3 V |
| C5 | 6,7 nF; 400 V |
| C6, C7 | 470 pF; 2 kV |
| C8, C9 | 88 nF; 400 V |
| C12 | 220 nF; 250 V |
| C14 | 150 nF; 400 V |
| D1–D4 | 1N4007 |
| D7–D10 | 1N4937 |
| D11, D14, D15 | LL4148 |
| DIAC1 | NEC, 32 V |
| L1 | BVL32 |
| STR1-A-STR1-C | EF16 4.5/15.5/15.5 windings |
| TR1 | R26 73/73/8 windings |
| T1, T2 | SGS F343 |
| T3, T4 | BC850C |
| VAR | S10 K250 |

TABLE 2

| Component list for the circuit of FIG. 7 | |
|---|---|
| WS1, WS2 | 2 windings |
| WS3 | 50 windings |
| RT | 47 kΩ |
| T | AD 844 |
| WE1 | 5 windings |
| WE2, WE3 | 50 windings |

We claim:

1. A switching power supply for the operation of electric lamps connected to an alternating voltage mains network or direct voltage source, comprising a switching portion (HB), which contains one or more switches (T1, T2) for generating a switched voltage, and which because of unavoidable parasitic capacitances also acts as an interference source capacitively coupled to the environment;

a radio interference suppression circuit for reducing interference signals generated by the switching portion, a trigger (TG; STR1-A-STR1-C; RK-a-RK-c) or controller for the switching portion (HB), a decoupling circuit (TR1), to which at least one electric lamp (HG) is connected either indirectly, via optionally one or more downstream further switching power supply or switching power supplies, or directly, characterized in that the radio interference suppression circuit has one or more controlled additional source (or additional sources) (ZW, F; GE, F; WE2; WE3) and a control circuit (TR1; WE1; I, T) connected to the switching portion and synchronizing the additional source or additional sources, wherein said control circuit comprises one of an open-loop control circuit (TR1, WE1, I, T) and a closed-loop control circuit (SE, T, WE1), wherein the additional source (or additional sources) and the control circuit contain an inverter and generating one compensation signal per additional source (ZW, F; GE, F;

WE2; WE3), which compensation signal is inverted relative to the interference signal generated by the switching portion; and wherein the additional source (or sources) is (are) connected either parallel or serially to the interference source, whereby a compensation between the interference signal and the compensation signal is attained.

2. The switching power supply of claim 1, wherein the control circuit comprises the open-loop control circuit (TR1, WE1, I, T), and said open-loop control circuit is connected to a tap (M) of one or more switches (T1, T2) of the switching portion, whereby the open-loop control circuit (TR1; WE1) is supplied with a synchronizing signal required for the synchronization.

3. The switching power supply of claim 2, wherein the power supply includes a bridge circuit (HB) having transistors, and wherein the junction point (M) of two bridge circuit transistors (T1; T2) forms the tap.

4. The switching power supply of claim 1, wherein the interference source and the additional source are connected in parallel, and the additional source has a controllable voltage generator (ZW; GE) and an equipotential face (F) connected to the voltage generator, and the equipotential face functions like one-half of a plate capacitor parasitically coupled to the environment.

5. The switching power supply of claim 4, wherein the equipotential face is formed by a metal face (F) disposed in the vicinity of the switching portion (HB), and the open-loop control circuit (TR1; I, T) contains the inverter, and the potential changes of the metal face are inverted relative to the potential changes of the tap (M) in the switching portion (HB).

6. The switching power supply of claim 5, wherein the metal face (F) is part of a printed circuit board on which the switching power supply is assembled, and the surface area and shape are adapted to the layout of the printed circuit board and the components used in such a way that minimization of the interfering signals is attained.

7. The switching power supply of claim 4, wherein the control circuit comprises the open-loop control circuit and said control circuit has, in addition to the inverter (I), a driver stage (T), and wherein the voltage generator is connected to the open-loop control circuit and has an end stage (GE); and wherein the inverter (I) is supplied with the synchronization signal, and the end stage (GE), triggered by the driver stage (T), is connected to the equipotential face (F).

8. The switching power supply of claim 4, wherein the inverter includes a transformer (TR1), the primary winding of the transformer (TR1) being supplied with the synchronization signal, and the secondary winding of the transformer (TR1) being connected to the equipotential face (F), whereby the primary winding functions as the open-loop control circuit and the secondary winding functions as the voltage generator.

9. The switching power supply of claim 8, wherein the decoupling circuit comprises a power transformer (TR1), which also forms a transformer for forming the open-loop control circuit and the voltage generator; primary side of the transformer is connected to the switching portion and its secondary side is connected to at least one incandescent lamp (HG);

the secondary side of the power transformer has an additional winding (ZW), whose first end is connected to the equipotential face (F) and whose second end is connected to a point (FP) of the switching power supply, and the point (FP) has a potential such that a compensation current that is capacitively coupled to the environment and is inverted relative to the common-mode noise flows across the equipotential face (F).

10. The switching power supply of claim 1, wherein the interference source and the additional source are connected serially, the switching power supply has as many additional sources (WE2; WE3) as there are supply leads that come from the alternating voltage mains network (N) or from a direct voltage source and are connected to the switching power supply, and wherein, in each supply lead, there is one additional source (WE2; WE3) serially connected and, optionally, a mains rectifier (GR) is provided, selectively connected preceding, or following, the additional sources (WE2; WE3).

11. The switching power supply of claim 10, comprising a feed transformer (ES);

wherein the additional sources are formed by the secondary windings (WE2, WE3) of the feed transformer (ES), simultaneously functioning as an inverter, whose primary winding (WE1) is supplied with the synchronization signal.

12. The switching power supply of claim 11, wherein a coupling impedance (Z) is provided, and the synchronization signal is supplied to the primary winding (WE1) of the feed transformer (ES) via the coupling impedance (Z).

13. The switching power supply of claim 1, wherein the radio interference suppression circuit additionally includes a sensor transformer (SE);

the closed-loop control circuit includes a closed-loop control amplifier (T; T, WE1), wherein the windings (WS1, WS2) of the primary side of the sensor transformer (SE) are connected into the supply leads of the switching power supply that come from the alternating voltage mains network (N) or a direct voltage source, and wherein, optionally, the windings (WS1, WS2) of the primary side of the sensor transformer (SE) are selectively preceded or followed by a mains rectifier (GR) and the secondary winding (WS3) of the sensor transformer (SE) is connected to the closed-loop control amplifier (T; T, WE1), which in turn triggers the additional source or sources (GE, F; WE2; WE3), whereby the radio interference suppression circuit, together with capacitive couplings to the environment via parasitic capacitances, forms said closed-loop control circuit.

14. The switching power supply of claim 1, further including a mains rectifier (GR).

15. The switching power supply of claim 10, further including a main rectifier (GR) forming said direct voltage source.

16. The switching power supply of claim 13, further including a main rectifier (GR) forming said direct voltage source.

* * * * *